T. B. STOUT.

Potato Digger.

No. 9,689.

Patented Apr. 26, 1853.

UNITED STATES PATENT OFFICE.

THOS. B. STOUT, OF KEYPORT, NEW JERSEY.

IMPROVEMENT IN POTATO-DIGGERS.

Specification forming part of Letters Patent No. 9,689, dated April 26, 1853.

*To all whom it may concern:*

Be it known that I, T. B. STOUT, of Keyport, in the county of Monmouth and State of New Jersey, have invented a new and Improved Implement for Digging Potatoes; and I do hereby declare that the following is a full, clear, and exact description of the construction and operation of the same, reference being had to the annexed drawings, making a part of this specification, in which—

Figure 1:
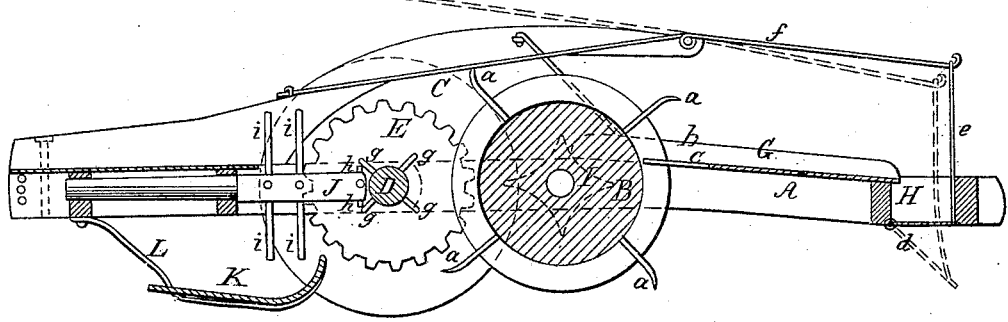
Figure 2:
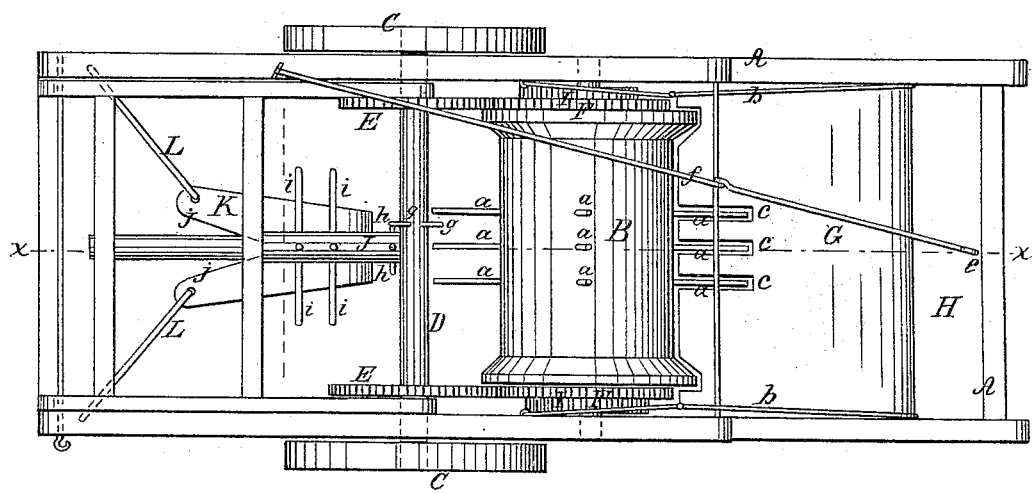

Figure 1 is a longitudinal vertical section taken at the line X X, Fig. 2. Fig. 2 is a plan or top view of same.

Similar letters of reference indicate corresponding parts in each of the two figures.

The nature of my invention consists in the employment or use of a cylinder having teeth upon its periphery so arranged as to take out the potatoes from the hills or drills, and using in connection with said cylinder a revolving beater and forked cutter arranged in a manner which will be hereinafter described, by which the potato-vines and also weeds and grass are cleared or cut off before the cylinder, so that the teeth of the cylinder may operate freely and effect their work thoroughly, as will be presently shown.

To enable others skilled in the art to make and use my invention, I will proceed to describe its construction and operation.

A represents a rectangular frame, made in any proper manner to support the several parts which will be described.

B is a cylinder placed transversely in the frame A, and having its bearings in the side pieces of the frame.

C C are the wheels; and D is the axle, on which are two toothed wheels, E E, adjoining the side pieces of the frame. These toothed wheels mesh into pinions F F, which are placed at each end of the cylinder B, and are attached to it. (See Fig. 2.) The teeth of the cylinder are represented by $a$. These teeth project a suitable distance from the cylinder and are of curved or hooked form. (See Fig. 1.) Any proper number of them may be used. They are placed in line or in rows upon the cylinder parallel with its axis.

G is an inclined apron, which conveys the potatoes into the box or receptacle H. The sides $b\ b$ of the apron rest upon cams I I, attached to the axis of the cylinder B. (See Fig. 2, and dotted lines in Fig. 1.) These cams give a shaking motion to the apron and cause the potatoes to descend into the box H. It will be seen that as the implement is moved along the teeth $a$ of the cylinder B hook or rake out the potatoes from the hills or drills and throw or carry them over on the apron G, the teeth passing through slots $c$ in the apron, (see Fig. 2,) the wheels C C communicating motion as they revolve to the cylinder by means of the toothed wheels E E meshing into the pinions F F. The box or receptcle H has a bottom hung on hinges $d$, so that by operating a rod, $e$, and lever $f$ the bottom may be depressed and the box emptied of its contents.

On the axle D of the wheels C C are placed teeth $g$, which mesh into teeth $h$ on a shaft, J, placed at right angles to the axle D, and running longitudinally with the frame A. This shaft J has beaters $i$ upon it, which revolve over a forked cutter, K. The beaters as they revolve force the vines, weeds, or grass against the cutting-edges $j\ j$. (See Fig. 2.) All weeds, grass, &c., in front of the implement must necessarily pass between these cutting-edges, because they are carried there by guides L L as the implement is moved along. The precise form of the cutter will be seen by referring to the drawings.

I am aware that various devices have been employed and many implements invented for the purpose of digging potatoes; but they have generally failed to work well, in consequence of weeds, grass, &c., preventing the scoops, rakes, &c., from doing their work thoroughly, the weeds and grass soon become entangled, and the implement is then ineffectual. To clean the teeth of the grass and weeds requires considerable time and labor, and in consequence of the above evil implements for this purpose are not in general use.

I have completely obviated the above objection, and my implement may be used on any farm which is not exceedingly rough and stony.

In the above implement I claim nothing separately. The cylinder, with its teeth attached, has been previously employed for other if not similar purposes; but

What I claim as new, and desire to secure by Letters Patent, is—

The cylinder B, with the teeth $a$ attached to its periphery, in combination with the beater $i$ and forked cutter K, the cylinder, beaters, and cutter being constructed and arranged in the manner substantially as herein shown and described.

THOS. B. STOUT.

Witnesses:
S. H. WALES,
THOS. MAHON.